US011753573B2

(12) United States Patent
Jamison et al.

(10) Patent No.: US 11,753,573 B2
(45) Date of Patent: Sep. 12, 2023

(54) CALCIUM CARBONATE LOST CIRCULATION MATERIAL MORPHOLOGIES FOR USE IN SUBTERRANEAN FORMATION OPERATIONS

(71) Applicant: Halliburton Energy Services, Inc., Houston, TX (US)

(72) Inventors: Dale E. Jamison, Humble, TX (US); Cato Russell McDaniel, The Woodlands, TX (US); Xiangnan Ye, Cypress, TX (US); Sharath Savari, Stafford, TX (US); Chesnee Lae Davis, Spring, TX (US); Jonathan Paul Walker, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/904,349

(22) Filed: Jun. 17, 2020

(65) Prior Publication Data
US 2020/0317984 A1 Oct. 8, 2020

Related U.S. Application Data

(62) Division of application No. 15/765,239, filed as application No. PCT/US2015/059150 on Nov. 5, 2015, now Pat. No. 10,723,935.

(51) Int. Cl.
*C09K 8/487* (2006.01)
*C09K 8/03* (2006.01)
(Continued)

(52) U.S. Cl.
CPC .............. *C09K 8/487* (2013.01); *C09K 8/032* (2013.01); *C09K 8/5045* (2013.01); *C09K 8/665* (2013.01)

(58) Field of Classification Search
CPC ...... C09K 8/487; C09K 8/032; C09K 8/5054; C09K 8/665
See application file for complete search history.

(56) References Cited

U.S. PATENT DOCUMENTS 5,376,343 A 12/1994 Fouche
6,685,908 B1 2/2004 Yaniv
(Continued)

FOREIGN PATENT DOCUMENTS

WO 2011031172 3/2011
WO 2013085412 6/2013
(Continued)

OTHER PUBLICATIONS

Fernandez-Diaz, et al., "The Role of Magnesium in the Crystallization of Calcite and Aragonite in a Porous Medium," Journal of Sedimentary Research, Section A: Sedimentary Petrology and Processes, May 1996, vol. 66, No. 3. pp. 482-491.
(Continued)

*Primary Examiner* — Crystal J. Lee
(74) *Attorney, Agent, or Firm* — Thomas Rooney; C. Tumey Law Group, PLLC

(57) ABSTRACT

Methods including precipitated and mined calcium carbonate lost circulation materials for use in subterranean formation operations. The precipitated calcium carbonate lost circulation materials are formed under a chosen set of precipitation conditions, including in situ in a subterranean formation. The mined calcium carbonate lost circulation materials are obtained in a desired morphological form under naturally occurring mined conditions. The precipitated and mined calcium carbonate lost circulation materials may be needle-shaped aragonite having an aspect ratio of about 1.4 to about 15.

20 Claims, 5 Drawing Sheets

(51) Int. Cl.
*C09K 8/504* (2006.01)
*C09K 8/66* (2006.01)

(56) References Cited

U.S. PATENT DOCUMENTS

| | | | |
|---|---|---|---|
| 6,889,780 B2 | 5/2005 | Whitfill et al. | |
| 7,612,021 B2 | 11/2009 | Chatterji et al. | |
| 8,168,569 B2 | 5/2012 | Ballard et al. | |
| 8,776,882 B2 | 7/2014 | Shindgikar et al. | |
| 9,410,065 B2 | 8/2016 | Jamison et al. | |
| 9,902,652 B2 * | 2/2018 | Devenney | C04B 14/28 |
| 2010/0009874 A1 | 1/2010 | Ballard et al. | |
| 2011/0027850 A1 | 2/2011 | Crawford et al. | |
| 2013/0233623 A1 * | 9/2013 | Aston | C09K 8/08 |
| | | | 175/65 |
| 2014/0044619 A1 * | 2/2014 | Hasinoff | C01F 11/468 |
| | | | 423/161 |
| 2014/0054039 A1 | 2/2014 | Chang et al. | |
| 2014/0162909 A1 | 6/2014 | Ballard et al. | |
| 2014/0209307 A1 * | 7/2014 | Jamison | C09K 8/502 |
| | | | 166/305.1 |
| 2014/0209386 A1 * | 7/2014 | Jamison | C09K 8/032 |
| | | | 175/65 |
| 2015/0096464 A1 | 4/2015 | Chen et al. | |
| 2015/0159076 A1 | 6/2015 | Arias Prada et al. | |
| 2015/0307400 A1 | 10/2015 | Devenney et al. | |
| 2017/0283681 A1 * | 10/2017 | Husein | E21B 43/16 |
| 2017/0369329 A1 | 12/2017 | Paynter et al. | |

FOREIGN PATENT DOCUMENTS

| | | | |
|---|---|---|---|
| WO | 2014008193 | 1/2014 | |
| WO | 2014172399 | 10/2014 | |
| WO | 2016115386 | 7/2016 | |
| WO | WO-2016115386 A1 * | 7/2016 | ........... B01D 53/501 |
| WO | 2017078713 | 5/2017 | |

OTHER PUBLICATIONS

Kawaguchi et al., "Crystallization of inorganic compounds in polymer solutions. Part I: Control of shape and form of calcium carbonate," Colloid & Polymer Science, 1992, vol. 270, pp. 1176-1177.
Wray et al., "Precipitation of Calcite and Aragonite," Journal of the American Chemical Society, May 1957, vol. 79m, No. 9, pp. 2031-2034.
International Search Report and Written Opinion from PCT/US2015/059150, dated May 13, 2016, 12 pages.
Toyama, T., Yoshida, H., Kojima, Y., & Nishimiya, N. (2011). Morphological control of hydroxyapatite precipitate from high-concentration hydroxyapatite solution by microwave irradiation. IOP Conference Series: Materials Science and Engineering, 18(5), 052002.
Shanmugam et al., "Temperature Controlled Synthesis of ZnS Nanocrystals by Simple Chemical Precipitation," Walailak Journal, 2013, vol. 10, No. 2, pp. 149-157.
Kirboga et al., "Effect of the Experimental Parameters on Calcium Carbonate Precipitation," Chemical Engineering Transactions, 2013, vol. 32, pp. 2119-2124.
Qi et al., "Control of Barite Morphology by Double-Hydrophilic Block Copolymers," Chem. Mater., 2000, vol. 12, pp. 2392-2403.
Office Action Summary for U.S. Appl. No. 15/765,239 dated Sep. 6, 2019.
Final Office Action Summary for U.S. Appl. No. 15/765,239 dated Feb. 4, 2020.
Notice of Allowance for U.S. Appl. No. 15/765,239 dated May 13, 2020.

* cited by examiner

CALCIUM CARBONATE LOST CIRCULATION MATERIAL MORPHOLOGIES FOR USE IN SUBTERRANEAN FORMATION OPERATIONS

BACKGROUND

The present disclosure relates to subterranean formation operations and, more particularly, to calcium carbonate lost circulation material morphologies for use in subterranean formation operations.

Hydrocarbon producing wells (e.g., oil producing wells, gas producing wells, and the like) are created and stimulated using various treatment fluids introduced into the wells to perform a number of subterranean formation operations. The general term "treatment fluid," as used herein, refers generally to any fluid that may be used in a subterranean application in conjunction with a desired function and/or for a desired purpose. The term "treatment fluid" does not imply any particular action by the fluid or any component thereof.

Hydrocarbon producing wells are first formed by drilling a wellbore into a subterranean formation, involving circulating a drilling treatment fluid as the wellbore is bored out using a drill bit. Primary cementing may then be performed using a cement slurry treatment fluid to enhance the structural integrity of the wellbore. Stimulation of hydrocarbon producing wells involves introducing a fracturing treatment fluid, sometimes called a carrier treatment fluid when particulates entrained therein. The fracturing treatment fluid is pumped into a portion of a subterranean formation (which may also be referred to herein simply as a "formation") above a fracture gradient sufficient to break down the formation and create one or more fractures therein. As used herein, the term "fracture gradient" refers to a pressure (e.g., flow rate) necessary to create or enhance at least one fracture in a subterranean formation.

Typically, particulate solids are suspended in a portion of one or more treatment fluids and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture."

During any of the aforementioned subterranean formation operations, or additional subterranean formation operations (e.g., cementing operations, re-fracturing operations, gravel packing operations, frac-packing operations, acidizing operations, scale dissolution and removal operations, sand control operations, consolidation operations, and the like), a portion of the treatment fluid used may be lost during the operation. This loss may be referred to as "lost circulation," meaning the reduced or total absence of fluid flow to the surface from a wellbore due to loss to the formation itself. This loss may be due, for example, to undesirable leak-off into natural or created fractures or fissures present in the formation. The loss of the treatment fluids may, among other things, render the treatment fluid less effective or ineffective, result in a buildup of any solid materials within the formation (i.e., a "filtercake") hindering production operations, and the like.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
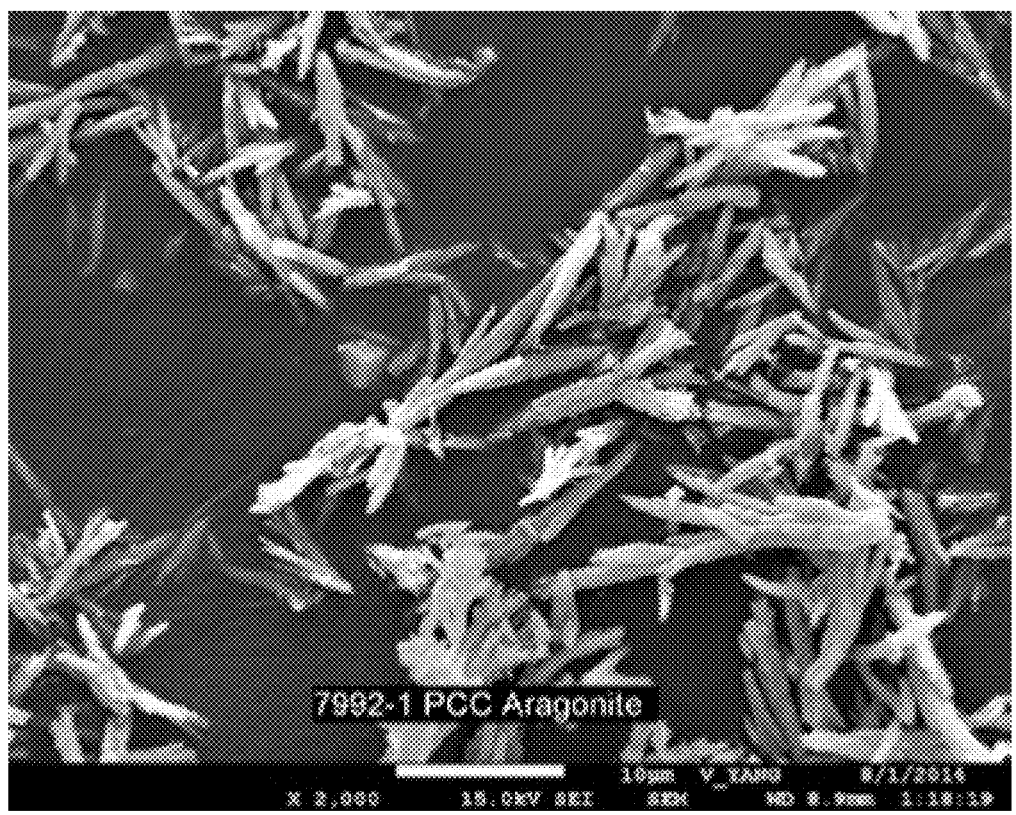
FIG. 1 depicts the needle-shaped precipitated calcium carbonate lost circulation materials, according to one or more embodiments of the present disclosure.

The present disclosure relates to subterranean formation operations and, more particularly, to calcium carbonate lost circulation material morphologies for use in subterranean formation operations.

Specifically, the present disclosure employs precipitated or non-precipitated calcium carbonate lost circulation materials, which may in some instances be precipitated in situ within a subterranean formation. In other embodiments, the calcium carbonate lost circulation materials may be precipitated outside the formation or may be a naturally occurring mined calcium carbonate having desirable morphological properties for use as a lost circulation material.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

Traditional calcium carbonate lost circulation materials are formed by a grinding process, which offers only a minimal degree of morphological tailoring. Grinding processes usually produce only a set particle shape (often substantially spherical) with a broad size range, neither of which may be optimal for use alone as a lost circulation material. Spherical particles, for example, at least when they are alone, may be prone to settling and inducing sag in a treatment fluid or may be limited in their effectiveness based on the size and shape of fractures or vugs in a formation. In addition, the grinding process may prevent fine-tuning of particular shapes and sizes of the calcium carbonate.

Unlike utilizing the traditional method of grinding to form desired morphologies of calcium carbonate lost circulation materials, as previously discussed, the present disclosure relates to calcium carbonate lost circulation materials (CCLCMs) that are either precipitated or naturally mined, each having particular morphological properties. CCLCMs formed under a chosen set of precipitation conditions will be referred to herein as "precipitated calcium carbonate lost circulation materials" or "PCCLCMs." The PCCLCMs may be formed in situ in a subterranean formation or at a surface location outside of the subterranean formation, according to the embodiments described herein. CCLCMs obtained in a desired morphological form under naturally occurring mined conditions will be referred to herein as "mined calcium carbonate lost circulation materials" or "MCCLCMs."

Additionally, the embodiments described herein can reduce costs associated with purchasing traditional calcium carbonate for subterranean formation operations, reduce or prevent over usage of calcium carbonate (e.g., where it is precipitated and only reactants are used rather than calcium carbonate itself), allow morphological manipulation to ensure effective lost circulation control, enhance certain qualities of the subterranean formations into which it is placed when precipitation occurs in situ, and the like.

Referring first to the PCCLCMs, the PCCLCMs may have significantly different shapes and sizes compared to those produced during grinding processes, which has been found to be desirable during the formulation and use of such PCCLCMs in treatment fluids. In addition, by altering the conditions under which a precipitation reaction is conducted, differing particle shapes and sizes may be produced, thereby offering further opportunities for tailoring the properties of a treatment fluid.

The precipitation of calcium carbonate occurs instantly when calcium ions ($Ca^{2+}$) contact carbonate ions ($CO_3^{2-}$). As described in greater detail below, these calcium and carbonate ions may be ions in their native form (i.e., having a net electric charge) or may be compounds that are capable of supplying such ions with the loss or gain of one or more electrons. The present inventors discovered various precipitation techniques whereby PCCLCMs may be produced in bulk from readily available materials, where the precipitated particles have a morphology that may be altered by adjusting the precipitation conditions. As used herein, the term "morphology" and grammatical variants thereof refers to the external shape of an object or substance. Depending on the chosen precipitation conditions, the PCCLCMs may be one of at least three (3) types, each having different morphology: (1) calcite, which is substantially cubic in shape; (2) vaterite, which is substantially spherical in shape; and (3) aragonite, which is needle-shaped. Although each shape may be used with some effectiveness, particularly when in combination, the needle-shaped aragonite is especially suitable for use as a CCLCM due to its shape and, thus, its enhanced bridging capacity. As used herein, the term "needle-shaped" refers to an acuate shape having an aspect ratio of greater than about 1.4, to an unlimited upper limit. FIG. 1 shows the shape of the needle-shaped PCCLCMs for use in the embodiments of the present disclosure. The shape shown in FIG. 1 is equally applicable to the needle-shaped MCCLCMs described herein.

As stated above, the PCCLCMs may be precipitated in situ or at a surface location prior to being introduced into a subterranean formation. With regard to in situ precipitation, in some embodiments, the present disclosure provides a method of introducing a calcium treatment fluid into a subterranean formation. The calcium treatment fluid comprises an aqueous base fluid and a calcium species. Separately, a carbonate treatment fluid is introduced into the subterranean formation. The carbonate treatment fluid comprises an aqueous base fluid and a carbonate species. Once in the formation together, the calcium species and the carbonate species react in situ, thereby forming PCCLCM. As with any treatment fluid described herein, the aqueous base fluid, described in more detail below, may be the same or different in the calcium and carbonate treatment fluids, without departing from the scope of the present disclosure.

In other embodiments, with regard to in situ precipitation, the present disclosure provides a method of introducing a calcium treatment fluid into a subterranean formation. The calcium treatment fluid comprises an aqueous base fluid and a calcium species. Separately, a supercritical carbon dioxide treatment fluid is introduced into the subterranean formation. Once in the formation together, the calcium species and the supercritical carbon dioxide react in situ, thereby forming PCCLCM. The supercritical carbon dioxide may be used in addition to or apart from the carbonate treatment fluid, without departing from the scope of the present disclosure. As used herein, the term "supercritical carbon dioxide" refers to the fluid state of carbon dioxide where it is held at or above its critical temperature and critical pressure.

The carbonate and/or supercritical carbon dioxide treatment fluids may be introduced before or after the calcium treatment fluid, without departing from the scope of the present disclosure. In other embodiments, the carbonate and/or supercritical carbon dioxide treatment fluids and the calcium treatment fluid are introduced into the subterranean formation simultaneously. Whether the calcium treatment fluid and carbonate and/or supercritical carbon dioxide treatment fluids are introduced separately at different times or separately simultaneously can be used to control the time or location within the formation in which the PCCLCMs are formed. Additionally, pad fluids or other treatment fluids may be included between the introduction of the calcium treatment fluid and carbonate and/or supercritical carbon dioxide treatment fluids to further control such timing and location of forming the PCCLCMs, without departing from the scope of the present disclosure. For example, an aqueous plug treatment fluid may be introduced between the calcium treatment fluid and the carbonate and/or supercritical carbon dioxide treatment fluids to provide isolation between the two fluids. As used herein, the term "aqueous plug treatment fluid" or simply "aqueous plug" refers to an aqueous fluids comprising a gelling agent (e.g., a polysaccharide) that is either linear (i.e., non-crosslinked) or crosslinked.

The PCCLCMs may be formed in situ using either batch treatment systems or continuous treatment systems, without departing from the scope of the present disclosure. As used herein, the term "batch treatment system" refers to introducing first either the calcium treatment fluid or the carbonate treatment fluid into a subterranean formation (e.g., to a target zone therein), followed by the introduction of the other treatment fluid into the subterranean formation (e.g., to the target zone therein). As used herein, the term "continuous treatment system" refers to introducing both calcium treatment fluid and carbonate treatment fluid continuously (simultaneously), although separately, into a subterranean formation (e.g., to a target zone therein).

The in situ formation of the PCCLCMs can occur in any subterranean formation type suitable for performing a particular subterranean formation operation. In some embodiments, the PCCLCMs are formed (i.e., precipitated) in situ in a sandstone, carbonate, and/or shale subterranean formation. As used herein, the term "sandstone subterranean formation" or simply "sandstone formation" refers to a formation comprising predominately sedimentary rock consisting of sand or quartz. As used herein, the term "shale subterranean formation" or simply "shale formation" refers to a formation comprising fine-grained, clastic sedimentary rock composed of mud, clay, and silt-sized particles of other minerals, such as quartz and calcite. As used herein, the term "carbonate subterranean formation" or simply "carbonate formation" refers to a formation comprising carbonate minerals. The formation of the PCCLCMs in situ within and in contact with the sandstone, carbonate, and/or shale formation enhances the strength of the thereof by decreasing the formation's porosity. That is, as the PCCLCMs are formed in situ in the sandstone, carbonate, and/or shale subterranean formation, the precipitation itself causes the porosity of the formation to decrease, thus enhancing the strength of the thereof, as shown in detail below. In other embodiments, the formation of the PCCLCMs in situ within and in contact with the sandstone, carbonate, and/or shale formation enhances the consolidation of loose silica (or sand) particulates present in the therein, as shown in detail below. It will be appreciated that both the strengthening and consolidation of loos particulates may occur in the same formation and that such results may be achieved in formations other than sandstone, carbonate, and shale formations, without departing from the scope of the present disclosure.

In other embodiments, the PCCLCMs are formed at a surface location and then placed downhole within a subterranean formation for performing lost circulation control during one or more subterranean formation operations. In such instances, the PCCLCMs are formed using a reaction mixture comprising the calcium species and the carbonate species and/or the supercritical carbon dioxide treatment fluid, as described above. Specifically, the PCCLCM is formed from a reaction mixture comprising the calcium species and the carbonate species, or the calcium species and the supercritical carbon dioxide treatment fluid, and the preselected precipitation conditions are selected to achieve particulates sizes and morphologies of the PCCLCMs. Such preselected precipitation conditions include, but are not limited to, the concentration of the calcium species, the concentration of the carbonate species, the mixing rate of the reaction mixture, a temperature of the reaction mixture, the amount of supercritical carbon dioxide, a presence and amount of any additives described herein, and any combination thereof. The formed PCCLCMs are then introduced into a lost circulation treatment fluid comprising a base fluid and introduced into a subterranean formation, again where both a batch treatment system or a continuous treatment system may be used.

It should be understood that although such preselected precipitation conditions are discussed herein with reference to PCCLCMs formed at a surface location, such conditions may additionally be adjusted to achieve desired sizes and morphologies of PCCLCMs formed in situ, without departing from the scope of the present disclosure. For example, the concentration of both the calcium and carbonate species in their respective treatment fluids can be manipulated, the rate or pressure of the calcium and carbonate treatment fluids as they are introduced into the subterranean formation can be manipulated to affect a mixing rate, the temperature of the subterranean formation may be selected based on natural temperature or otherwise manipulated (e.g., by introducing a heat source or a cooling source), and/or the amount of supercritical carbon dioxide introduced into the subterranean formation may be manipulated, each to affect the size and morphology of the PCCLCMs. Indeed, such manipulation may be preferred when forming PCCLCMs in situ to ensure that desired size and morphologies of the PCCLCMs is achieved.

As used herein, the term "PCCLCM" will refer collectively to PCCLCMs formed in situ and at the surface, unless otherwise specified. The calcium species for forming the PCCLCMs described herein may be any species capable of providing a calcium ion and suitable for use in a subterranean formation operation. Examples of suitable calcium species include, but are not limited to, a calcium ion, a calcium soluble salt, and any combination thereof. Examples of suitable calcium soluble salts include, but are not limited to, calcium nitrate, calcium acetate, calcium citrate, calcium gluconate, calcium lactate, calcium bromide, calcium chloride, calcium iodide, calcium nitride, calcium formate, and any combination thereof.

The carbonate species for forming the PCCLCMs described herein may be any species capable of providing a carbonate ion and suitable for use in a subterranean formation operation. Examples of suitable carbonate species include, but are not limited to, a carbonate ion, an ammonium carbonate ion, a bicarbonate ion, a calcium bicarbonate ion, a Group I carbonate compound, a Group I bicarbonate compound, and any combination thereof. The term "Group I" encompasses the elements of hydrogen, lithium, sodium, potassium, rubidium, caesium, and francium.

Referring now to the non-precipitated MCCLCMs, the inventors have discovered that mined calcium carbonate can be used effectively as CCLCMs when the MCCLCMs are obtained having the particular needle-shaped morphology described herein. That is, the MCCLCMs are needle-shaped, having an aspect ratio of greater than about 1.4, as they are removed from geological formations from the earth. After the MCCLCMs are mined, they are sieved or sized to ensure that they meet the needle-shaped size specification described herein for use as a lost circulation material. However, after the MCCLCMs are mined, there is no need to further physically process the MCCLCMs (i.e., no grinding or alteration to their physical morphology), thereby reducing costs associated with operator time, equipment requirements, equipment wearing, and the like.

Whether the PCCLCMs are formed in situ or at the surface, they may be any of spherical, cubic, or needle-shaped in morphology and a mixture of such morphologies may be preferred to achieve lost circulation control. Similarly, such a wide morphological range is possible for MCCLCMs. However, in preferred embodiments, the PCCLCMs and MCCLCMs (collectively referred to simply as "CCLCMs" unless otherwise specified) are at least partially needle-shaped, having an aspect ratio of greater than about 1.4, to an unlimited upper limit. The needle-shaped CCLCMs may advantageously modify the density and rheological properties of a treatment fluid into which it is included. For example, needle-shaped CCLCMs may provide for decreased particle sag, increased viscosity, increased yield strength, and increased fluid loss control when measured compared to a treatment fluid comprising an equivalent concentration of spherical or cubic CCLCMs of like type. As used herein, the term "like type" refers to CCLCMs having the same predominant chemical composition, but with a differing morphology. For this reason, when used in combination with spherical or cubic CCLCMs, the needle-shaped CCLCMs can aid in increasing their suspension. Additionally, when used in a drilling operation, the needle-shaped CCLCMs will accordingly aid in suspending drill cuttings for removal from the wellbore to the surface.

Moreover, the needle-shaped CCLCMs are able to pack together and act as a bridging agent to control lost circulation. As used herein, the term "bridging agent" refers to a material or substance capable of bridging across formation pore throats or fractures to form a filtercake and prevent or reduce loss of treatment fluids. The needle-shaped CCLCMs, due to their unique shape, are able to overlap upon one another and form a woven-like filtercake that may be more effective than like type CCLCMs. In some embodiments, the aspect ratio of the needle-shaped CCLCMs of the present disclosure is in the range of about 1.4 to about 15, encompassing any value and subset therebetween. When the CCLCMs are precipitated, the aspect ratio is achieved after they are precipitated. For example, the aspect ratio of the needle-shaped CCLCMs may be of from about 1.4 to about 3.1, or about 3.1 to about 4.8, or about 4.8 to about 6.5, or about 6.5 to about 8.2, or about 8.2 to about 9.9, or about 9.9 to about 11.6, or about 11.6 to about 13.3, or about 13.3 to about 15, or about 3.4 to about 13, or about 5.4 to about 11, or about 7.4 to about 9, encompassing any value and subset therebetween. Each of these values is critical to the embodiments of the present disclosure and depend on a number of factors including, but not limited to, the type of subterranean formation, the size of the area to which the CCLCM is intended to remediate, the combination of other shape or sizes of lost circulation materials, and the like, and any combination thereof.

The CCLCMs, including the needle-shaped CCLCMs, described herein are shaped and sized such that they are able to provide lost circulation control during a subterranean formation operation. The size of the CCLCMs of the present disclosure may be such that 95% of the CCLCMs have a unit mesh size in the range of about 1 micrometer (μm) to about 100 μm, encompassing any value and subset therebetween. As used herein, the term "unit mesh size" refers to a size of an object (e.g., a CCLCM) that is able to pass through a square area having each side thereof equal to a specified numerical value. When the CCLCMs are precipitated, the unit mesh size is achieved after they are precipitated. As examples, the CCLCMs may have a unit mesh size of from about 1 μm to about 12.5 μm, or about 12.5 μm to about 25 μm, or about 25 μm to about 37.5 μm, or about 37.5 μm to about 50 μm, or about 50 μm to about 62.5 μm, or about 62.5 μm to about 75 μm, or about 75 μm to about 87.5 μm, or about 87.5 μm to about 100 μm, or about 20 μm to about 80 μm, or about 40 μm to about 60 μm, encompassing any value and subset therebetween. Each of these values is critical to the embodiments of the present disclosure and depend on a number of factors including, but not limited to, the type of subterranean formation, the size of the area requiring lost circulation control in the formation (e.g., a wide unit mesh size distribution may be desirable in such circumstances), the presence of non-needle-shaped CCLCMs, and the like, and any combination thereof.

As used herein, the term "treatment fluid" collectively refers to the calcium treatment fluid, the carbonate treatment fluid, and the supercritical carbon dioxide treatment fluids of the present disclosure, unless otherwise specifically indicated. The treatment fluids comprising the CCLCMs described herein may be used in any subterranean formation operation requiring lost circulation control, without departing from the scope of the present disclosure. Examples of suitable subterranean formation operations in which the treatment fluids described herein may be used include, but are not limited to, a drilling operation, a completion operation, a hydraulic fracturing operation, a cementing operation, and any combination thereof.

The treatment fluids described herein comprise a base fluid in addition to the CCLCMs of the present disclosure. The base fluid may be any fluid suitable for use in a subterranean formation that does not interfere with the ability of the CCLCMs to perform lost circulation control. Examples of suitable base fluids for use in the treatment fluids may include, but are not limited to, an aqueous base fluid, an aqueous miscible base fluid, an oil base fluid, a water-in-oil emulsion, an oil-in-water emulsion, a viscoelastic surfactant base fluid, and any combination thereof.

Aqueous base fluids suitable for use in the treatment fluids described herein may include, but are not limited to, fresh water, saltwater (e.g., water containing one or more salts dissolved therein), brine (e.g., saturated salt water), seawater, produced water (e.g., water produced as a byproduct from a subterranean formation during hydrocarbon production), waste water (e.g., water that has been adversely affected in quality by anthropogenic influence) that is untreated or treated, and any combination thereof. Generally, the water may be from any source, provided that it does not contain components that might adversely affect the stability and/or performance of the treatment fluids. Suitable aqueous-miscible fluids may, in some embodiments, include, but not be limited to, an alcohol (e.g., methanol, ethanol, n-propanol, isopropanol, n-butanol, sec-butanol, isobutanol, and t-butanol), a glycerin, a glycol (e.g., polyglycols, propylene glycol, and ethylene glycol), a polyglycol amine, a polyol, any derivative thereof, any in combination with a salt (e.g., sodium chloride, calcium chloride, calcium bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous base fluid described above, and any combination thereof.

Suitable oil-based fluids may include, but are not limited to, an alkane, an olefin, an aromatic organic compound, a cyclic alkane, a paraffin, a diesel fluid, a mineral oil, a desulfurized hydrogenated kerosene, and any combination thereof. Suitable water-in-oil emulsions, also known as invert emulsions, may have an oil-to-water ratio of from a greater than about 50:50, to less than about 100:0, encompassing any value and subset therebetween. Suitable oil-in-water emulsions may have a water-to-oil ratio of from a greater than about 50:50, to less than about 100:0, encompassing any value and subset therebetween. It should be noted that for water-in-oil and oil-in-water emulsions, any mixture of the above may be used including the water being and/or comprising an aqueous-miscible fluid.

Viscoelastic surfactant fluids for use as the base fluids described herein may include, but are not limited to those that are cationic, anionic, or amphoteric in nature. Suitable examples of viscoelastic surfactant fluids may include, but are not limited to, a methyl ester sulfonate, a hydrolyzed keratin, a taurate, an amine oxide, an ethoxylated amide, an alkoxylated fatty acid, an alkoxylated alcohol, an ethoxylated fatty amine, an ethoxylated alkyl amine, and any combination thereof.

In various embodiments, the treatment fluids may comprise the CCLCMs described herein, including the needle-shaped CCLCMs alone or in combination, in an amount up to about 70% by volume of the treatment fluid. When the CCLCMs are precipitated, the amount of PCCLCMs in the treatment fluid is measured based on post-precipitation. For example, the treatment fluids may comprise about 5% to about 20%, or about 10% to about 20%, or about 20% to about 40%, or about 25% to about 50%, or about 40% to about 70%, or about 10% to about 40% by volume of the treatment fluid, encompassing any value and subset therebetween. Each of these values is critical to the embodiments of the present disclosure and may depend on a number of factors including, but not limited to, the size of the CCLCMs, the type of subterranean formation, the size of the area to be treated with the CCLCMs, and the like, and any combination thereof.

In some embodiments, non-calcium carbonate degradable or non-degradable fibers may be included in the treatment fluids to synergistically associate with the CCLCMs to further facilitation formation of a filtercake and enhance lost circulation control. In some embodiments, the fibers, whether degradable or non-degradable, may be preferably flexible to further facilitate formation of the desired filtercake for lost circulation control. The fibers may have an aspect ratio similar or greater than the needle-shaped CCLCMs described herein to aid in forming a web-like complex to enhance lost circulation control in combination with the CCLCMs. The aspect ratio of the degradable or non-degradable fibers have an aspect ratio of greater than about 5, 10, or 25 to an unlimited upper limit, including greater than about 500, 5000, or 10000, encompassing every value and subset therebetween. The fibers may be the same unit mesh size as the CCLCMs, as described above, without departing from the scope of the present disclosure.

The non-calcium carbonate fibers may be made of any non-calcium carbonate material suitable for use in a subterranean formation operation. Examples of such materials include, but are not limited to, a clay, a ceramic, a glass, a zeolite, a polysaccharide (e.g., dextran, cellulose, and the like), a chitin, a chitosan, a silicone, a polyurethane, a protein, an aliphatic polyester, a poly(lactide), a poly(glycolide), a polysulfide, a nitrile rubber, a polybutene, a fluorinated thermoplastic elastomer, a poly(c-caprolactone), a poly(hydroxybutyrate), a poly(anhydride), an aliphatic polycarbonate, an aromatic polycarbonate, a poly(orthoester), a poly(amino acid), a poly(ethylene oxide), a polyphosphazene, a polyacrylic, a polyamide, a polyolefin (e.g., polyethylene, polypropylene, polyisobutylene, polystyrene, and the like), and any combination thereof. An example of a suitable commercially available fiber is BAROFIBRE® O, a cellulose material LCM, available from Halliburton Energy Services, Inc. in Houston, Tex.

When included in the treatment fluids described herein, the fibers are present in an amount of about 1% to about 30% by weight of the CCLCMs in the treatment fluid, encompassing any value and subset therebetween. For example, in some embodiments, the fibers are present in an amount of about 1% to about 6%, or about 6% to about 12%, or about 12% to about 18%, or about 18% to about 24%, or about 24% to about 30%, or about 6% to about 24%, or about 12% to about 18% by weight of the CCLCMs in the treatment fluid, encompassing any value and subset therebetween. Each of these values is critical to the embodiments of the present disclosure and depend on a number of factors including, but not limited to, the type of subterranean formation, the shape and size of the CCLCMs in the treatment fluid, the size of the area in the formation requiring lost circulation control, and the like, and any combination thereof.

The treatment fluids described herein may further include an additive for aiding in performing a particular subterranean formation (e.g., drilling, hydraulic fracturing, and the like). Any additive suitable for use in a subterranean formation operation may be used in accordance with the embodiments described herein provided that it does not interfere with the ability of the CCLCMs (and fibers, if applicable) to provide lost circulation control. Examples of suitable additives include, but are not limited to, a salt, a weighting agent (e.g., barite), an inert solid, a fluid loss control agent, an emulsifier, a dispersion aid, a corrosion inhibitor, an emulsion thinner, an emulsion thickener, a gelling agent (e.g., xanthan gum, BARAZAN® D PLUS, a powdered xanthan gum, available from Halliburton Energy Services, Inc. in Houston, Tex.), a surfactant, a particulate, a proppant, a gravel particulate, a traditional lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

The CCLCMs and, if present, fibers forming the lost circulation filtercakes described herein can be dissolved or degraded to reverse or remove fully or partially the filtercake. In some instances, such degradation may be due to formation conditions, such as temperature, pressure, salinity, the presence of produced fluids, and the like. In other instances, an acid flush fluid may be introduced into the subterranean formation after the CCLCMs and, if present, fibers have performed the desired lost circulation operation to dissolve or degrade the CCLCMs and fibers. In some instances, such an acid flush fluid will additionally reverse particulate consolidations and/or wellbore strengthening, such as in the case of the sandstone, carbonate, and shale formations, for example.

The acid flush fluid may include an undiluted or diluted acid. When diluted, any aqueous base fluid or aqueous-miscible base fluid as described above may be used. Examples of suitable acids for use in forming the acid flush fluid include, but are not limited to, hydrochloric acid, nitric acid, formic acid, sulfuric acid, carbonic acid, acetic acid, bromic acid, citric acid, tartartic acid, glutaric acid, folic acid, propionic acid, ascorbic acid, glutamic acid, uric acid, lactic acid, and any combination thereof.

Figure 2:
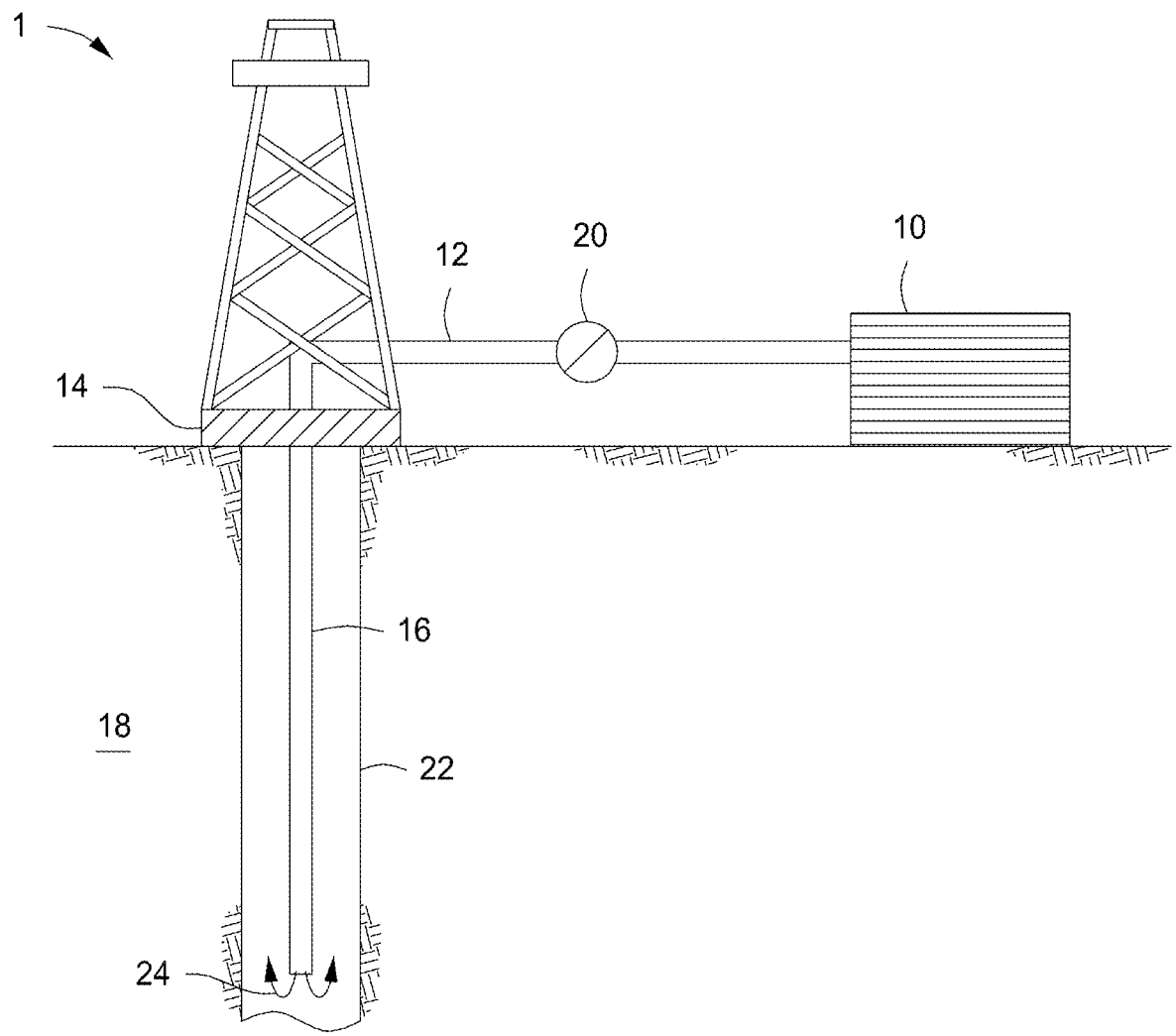
FIG. 2 depicts an illustrative schematic of a drilling assembly in which treatment fluids of the present disclosure may be introduced to a downhole location, according to one or more embodiments of the present disclosure.

FIG. 2 shows an illustrative schematic of a system that can deliver the treatment fluids of the present disclosure to a downhole location, according to one or more embodiments. The term "treatment fluid" as previously stated encompasses the calcium treatment fluid, the carbonate treatment fluid, and the supercritical carbon dioxide treatment fluid; it also encompasses the acid flush fluid for the purposes of FIG. 2.

It should be noted that while FIG. 2 generally depicts a land-based system, it is to be recognized that like systems may be operated in subsea locations as well. As depicted in FIG. 2, system 1 may include mixing tank 10, in which the fluids of the embodiments herein may be formulated. The fluids may be conveyed via line 12 to wellhead 14, where the fluids enter tubular 16, tubular 16 extending from wellhead 14 into subterranean formation 18. Upon being ejected from tubular 16, the fluids may subsequently penetrate into subterranean formation 18. Pump 20 may be configured to raise the pressure of the fluids to a desired degree before introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the fluid or a portion thereof (e.g., the broken fluid) may, in some embodiments, flow back to wellhead 14 and exit subterranean formation 18. In some embodiments, the fluid that has flowed back to wellhead 14 may subsequently be recovered and recirculated to subterranean formation 18, or otherwise treated for use in a subsequent subterranean operation or for use in another industry.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

While various embodiments have been shown and described herein, modifications may be made by one skilled in the art without departing from the scope of the present disclosure. The embodiments described here are exemplary only and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A: A method comprising: (a) introducing a calcium treatment fluid into a subterranean formation, the calcium treatment fluid comprising a first aqueous base fluid and a calcium species selected from the group consisting of a calcium ion, a calcium soluble salt, and any combination thereof; (b) introducing a carbonate treatment fluid into the subterranean formation, the carbonate treatment fluid comprising a third aqueous base fluid and a carbonate species selected from the group consisting of a carbonate ion, an ammonium carbonate ion, a bicarbonate ion, a calcium bicarbonate ion, a Group I carbonate compound, a Group I bicarbonate compound, and any combination thereof, and/or introducing a supercritical carbon dioxide treatment fluid into the subterranean formation; (c) reacting the calcium species with one or both of the carbonate species and/or the supercritical carbon dioxide treatment fluid in situ in the subterranean formation, thereby forming precipitated calcium carbonate lost circulation material (PCCLCM)

Embodiment A may have one or more of the following additional elements in any combination:

Element A1: Wherein the PCCLCM is needle-shaped aragonite having an aspect ratio of about 1.4 to about 15.

Element A2: Wherein greater than about 95% of the PCCLCM have a unit mesh size diameter of about 1 micrometer to about 100 micrometer.

Element A3: Wherein step (a) is performed before step (b), step (b) is performed before step (a), or step (a) and (b) are performed simultaneously.

Element A4: Further comprising introducing an aqueous plug treatment fluid into the subterranean formation between one of: (1) between the calcium treatment fluid and the carbonate treatment fluid, (2) between the calcium treatment fluid and the supercritical carbon dioxide treatment fluid, or (3) between the calcium treatment fluid and a combination of the carbonate treatment fluid and the supercritical carbon dioxide treatment fluid.

Element A5: Further comprising manipulating a condition selected from the group consisting of the concentration of the calcium species, the concentration of the carbonate species, a flow rate of the calcium treatment fluid, a flow rate of the carbonate treatment fluid, a temperature of the subterranean formation, a temperature of the calcium treatment fluid, a temperature of the carbonate treatment fluid, an amount of the supercritical carbon dioxide treatment fluid, a presence of any additives, an amount of any additives, and any combination thereof, wherein the manipulation of the condition alters a size and/or a morphology of the PCCLCM.

Element A6: Wherein the subterranean formation is a sandstone subterranean formation, a carbonate subterranean formation, or a shale subterranean formation and the PCCLCM further consolidates unconsolidated particulates therein.

Element A7: Wherein the subterranean formation is a sandstone subterranean formation, a carbonate subterranean formation, or a shale subterranean formation and the PCCLCM further decreases the porosity thereof.

Element A8: Wherein the calcium soluble salt is selected from the group consisting of calcium nitrate, calcium acetate, calcium citrate, calcium gluconate, calcium lactate, calcium bromide, calcium chloride, calcium iodide, calcium nitride, calcium formate, and any combination thereof.

Element A9: Wherein the calcium treatment fluid and the carbonate treatment fluid and/or the supercritical calcium carbonate treatment fluid are introduced during an operation selected from the group consisting of a drilling operation, a completion operation, a hydraulic fracturing operation, a cementing operation, and any combination thereof.

Element A10: Further comprising a pump coupled to a tubular extending into the subterranean formation, the tubular containing a fluid selected from the group consisting of the calcium treatment fluid, the carbonate treatment fluid, the supercritical carbon dioxide treatment fluid, and any combination thereof.

By way of non-limiting example, exemplary combinations applicable to A include: A1-A10; A1, A2, and A6; A3 and A9; A2, A5, and A7; A8 and A9; A2, A4, A5, and A6; A7 and A8; and the like.

Embodiment B: A method comprising: forming precipitated calcium carbonate lost circulation material (PCCLCM) from a reaction mixture comprising a calcium species and a carbonate species, or a calcium species and a supercritical carbon dioxide treatment fluid based on preselected precipitation conditions, wherein the calcium species is selected from the group consisting of a calcium ion, a calcium soluble salt, and any combination thereof, wherein the carbonate species is selected from the group consisting of a carbonate ion, an ammonium carbonate ion, a bicarbonate ion, a calcium bicarbonate ion, a Group I carbonate compound, a Group I bicarbonate compound, and any combination thereof, and wherein the preselected precipitation conditions are based on the manipulation of one or more conditions selected from the group consisting of the concentration of the calcium species, the concentration of the carbonate species, a mixing rate of the reaction mixture, a temperature of the reaction mixture, an amount of the supercritical carbon dioxide treatment fluid, a presence of any additives, an amount of any additives, and any combination thereof; and introducing a lost circulation treatment fluid into a subterranean formation, the lost circulation treatment fluid comprising an aqueous base fluid and the PCCLCM.

Embodiment B may have one or more of the following additional elements in any combination:

Element B1: Wherein the preselected precipitation conditions are selected such that the PCCLCM are needle-shaped aragonite having an aspect ratio of about 1.4 to about 15.

Element B2: Wherein greater than about 95% of the PCCLCM have a unit mesh size of about 1 micrometer to about 100 micrometer.

Element B3: Wherein the calcium soluble salt is selected from the group consisting of calcium nitrate, calcium acetate, calcium citrate, calcium gluconate, calcium lactate, calcium bromide, calcium chloride, calcium iodide, calcium nitride, calcium formate, and any combination thereof.

Element B4: Wherein the lost circulation treatment fluid is introduced during an operation selected from the group consisting of a drilling operation, a completion operation, a hydraulic fracturing operation, a cementing operation, and any combination thereof.

Element B5: Further comprising a pump coupled to a tubular extending into the subterranean formation, the tubular containing the lost circulation treatment fluid.

By way of non-limiting example, exemplary combinations applicable to B include: B1-B5; B1 and B3; B2, B4, and B5; B3 and B4; B2 and B5; B1 and B2; B1 and B4; and the like.

Embodiment C: A method comprising: introducing a lost circulation treatment fluid into a subterranean formation, the lost circulation treatment fluid comprising mined calcium carbonate lost circulation material (MCCLCM), wherein the MCCLCM are needle-shaped aragonite having an aspect ratio of about 1.4 to about 15, and wherein the MCCLCM are not further physically processed after they are mined.

Embodiment C may have one or more of the following additional elements in any combination:

Element C1: Wherein greater than about 95% of the PCCLCM have a unit mesh size of about 1 micrometer to about 100 micrometer.

Element C2: Further comprising a pump coupled to a tubular extending into the subterranean formation, the tubular containing the lost circulation treatment fluid.

Element C3: Wherein the lost circulation treatment fluid is introduced during an operation selected from the group consisting of a drilling operation, a completion operation, a hydraulic fracturing operation, a cementing operation, and any combination thereof.

By way of non-limiting example, exemplary combinations applicable to C include: C1-C3; C1 and C2; C1 and C3; C2 and C3; and the like.

To facilitate a better understanding of the embodiments of the present disclosure, the following examples of preferred or representative embodiments are given. In no way should the following examples be read to limit, or to define, the scope of the disclosure.

EXAMPLE 1

Figure 3:
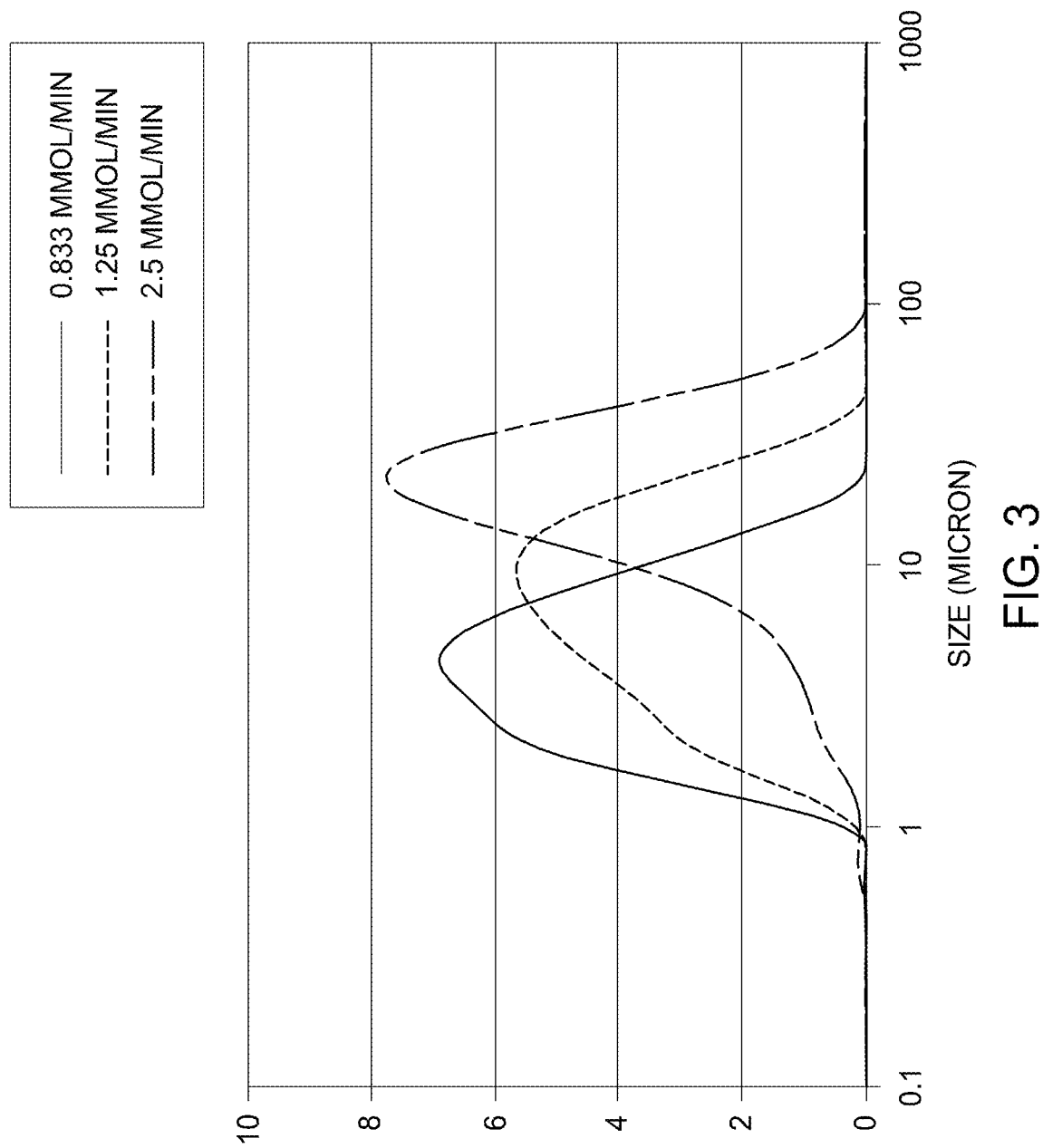
FIG. 3 depicts the effect of manipulating mixing rate precipitation conditions to alter the size of precipitated calcium carbonate lost circulation materials, according to one or more embodiments of the present disclosure.

In this example, adjustment of preselected precipitation conditions for forming PCCLCMs was evaluated to determine the size effect on the formation of the PCCLCMs. A calcium treatment fluid comprising calcium chloride was added into a carbonate treatment fluid comprising 200 milliliters (mL) of 0.1 molar (M) $Na_2CO_3$ carbonate species at three volumetric rates. The calcium treatment fluid was added 0.833 millimoles per minute (mmol/min), 1.25 mmol/min, and 2.5 mmol/min. As shown in FIG. 3, relatively larger PCCLCMs were formed at the lowest rate of 0.833 mmol/min rate and relatively smaller PCCLCMs were formed at the highest rate of 2.5 mmol/min, and PCCLCMs sized therebetween were formed at the middle rate of 1.25 mmol/min.

EXAMPLE 2

In this example, the MCCLCMs of the present disclosure were compared to traditional spherical calcium carbonate particulates, BARACARB® available from Halliburton Energy Services, Inc. in Houston, Tex. Two treatment fluids (TF1 and TF2) were prepared according to Table 1 below. Each of the components is either in pounds per barrel (ppb) or mL. There are 42 gallons (equivalent to 3.7854 liters) in a barrel. The symbol "--" indicates that the particular component was not included in the treatment fluid.

| Component | TF1 | TF2 |
|---|---|---|
| Water (base fluid) (ppb) | 331 | 331 |
| BARAZAN ® D PLUS (gelling agent) (ppb) | 1.5 | 1.5 |

-continued

| Component | TF1 | TF2 |
|---|---|---|
| Barite (weighting agent) (ppb) | 97 | 97 |
| 325 Mesh needle-shaped aragonite MCCLCM (ppb) | 10 | — |
| MCCLCM (ppb, needle-shaped) | 10 | — |
| BAROFIBRE ® O (fiber) (ppb) | 10 | 10 |
| BARACARB ® 50 (ppb) | — | 10 |
| BARACARB ® 400 (ppb) | — | 10 |

A fluid loss test was performed on each of TF1 and TF2. The fluid loss test was performed by use of a particle plugging apparatus. The test was performed on a 190 μm aloxite disc at room temperature and 500 pounds per square inch differential pressure. The test fluid was one barrel of 10 pounds per gallon viscosified water-based mud. The spurt loss and total fluid loss are shown in Table 2 for each treatment fluid. As shown, TF1 comprising the needle-shaped aragonite MCCLCMs resulted in a fluid loss of almost half of that of TF2 comprising traditional spherical calcium carbonate. If used in a drilling operation, for example, it is further believed that the needle-shaped MCCLCMs of the present disclosure would significantly reduce the amount of lost circulation due to drill solids and other particulates aiding in filtercake production.

EXAMPLE 3

Figure 4A:
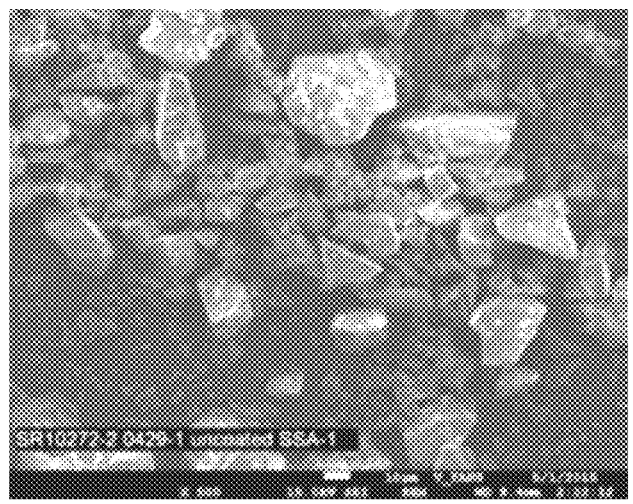
FIGS. 4A-C depict silica consolidation in the presence of in situ precipitation of calcium carbonate lost circulation materials, according to one or more embodiments of the present disclosure.
Figure 4B:
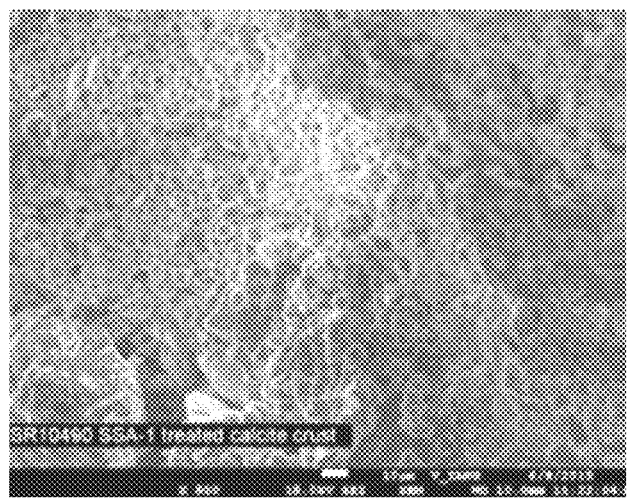
Figure 4C:
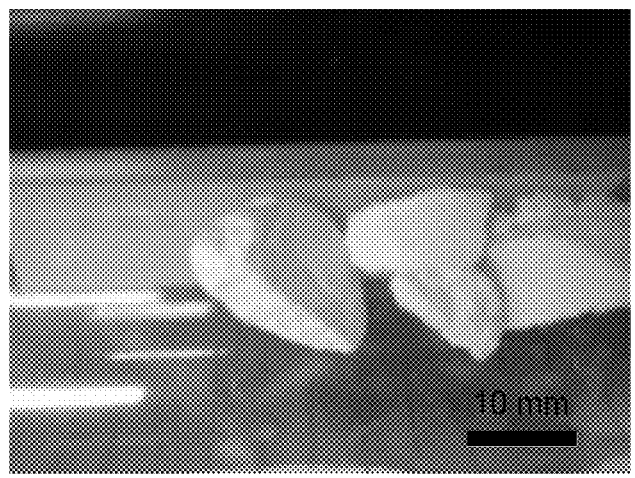

In this example, the ability of the PCCLCMs formed in situ to consolidate silica particulates in a subterranean formation was evaluated. Unconsolidated silica particulates, as seen in FIG. 4A, were treated with 170 millimoles (mmol) $Na_2CO_3$ containing 5 weight percent (wt %) of silica sand and an equaled-molar addition of $CaCl_2$ solution at 150 mL/hr. FIG. 4B depicts the unconsolidated silica particulates with a calcium carbonate "crust" formed from precipitation of the PCCLCMs in contact with the unconsolidated silica particulates. FIG. 4C shows the consolidation effect of the unconsolidated silica particulates after contact as the PCCLCMs were precipitated in situ, as apparent from the size difference between the initial unconsolidated silica particulates (FIG. 4A) and the subsequent consolidated silica particulates (FIG. 4C).

EXAMPLE 4

Figure 5A:
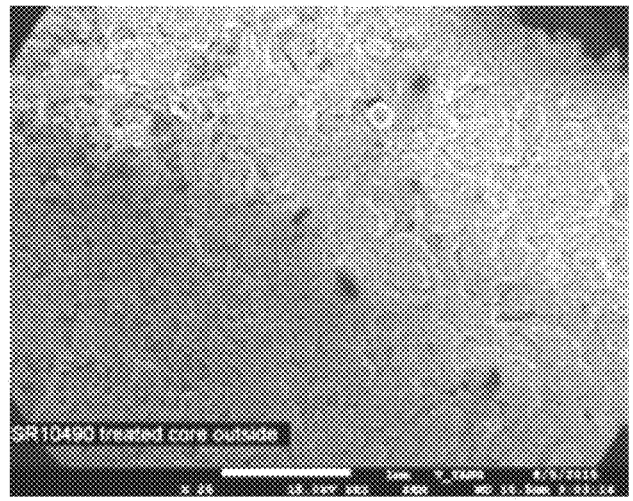
FIGS. 5A-B depict wellbore strengthening in the presence of in situ precipitation of calcium carbonate lost circulation materials, according to one or more embodiments of the present disclosure.
Figure 5B:
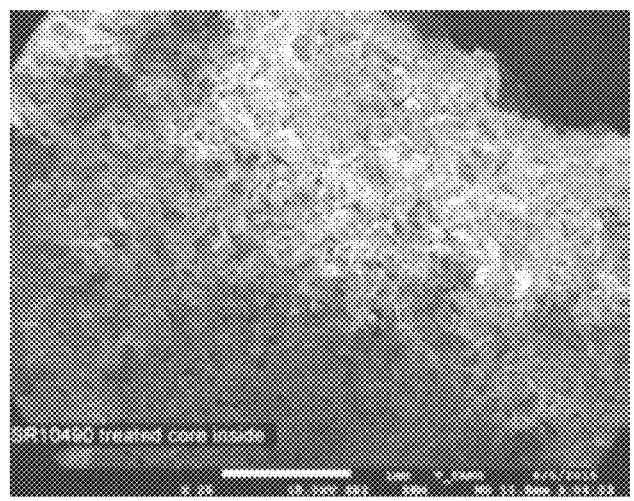

In this example, the ability of the PCCLCMs formed in situ to strengthen a subterranean formation was evaluated. A sandstone core sample was submerged in a carbonate treatment fluid of 0.5 M $Na_2CO_3$ solution for 12 hours, and then submerged in a calcium treatment fluid of 0.5 M $CaCl_2$ solution. The submerged core sample was placed in an oven at 150° F. (65.56° C.) overnight. As shown in FIG. 5A, formation of the PCCLCMs occurred outside of the core sample. The interior of the core sample was accessed and, as shown in FIG. 5B, it was further observed that formation of the PCCLCMs also occurred within the core sample. A visible decrease in porosity was observed on both the exterior and interior of the core sample due to the in situ formation of the PCCLCMs, enhancing the strength of the core sample itself.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method of treating lost circulation in a subterranean formation comprising:
   selecting an aspect ratio for a precipitated calcium carbonate lost circulation material (PCCLCM) based at least in part on a type of the subterranean formation;
   forming the PCCLCM to have the selected aspect ratio from a reaction mixture comprising a calcium species and a carbonate species;
      wherein the calcium species is selected from the group consisting of a calcium ion, a calcium soluble salt, and any combination thereof,
      wherein the carbonate species is an ammonium carbonate ion, and
      wherein the calcium species and the carbonate species are mixed in a mixing tank fluidically connected to a subterranean formation;
   adjusting precipitation conditions to alter morphology of the PCCLCM;
   adding non-calcium carbonate fibers to the reaction mixture, wherein the non-calcium carbonate fibers are present in an amount from about 1% to about 30% by weight of the PCCLCM; and
   introducing a lost circulation treatment fluid into the subterranean formation, the lost circulation treatment fluid comprising an aqueous base fluid and the PCCLCM, wherein at least a portion of the PCCLCM is deposited in a filter cake across the formation pore throats, and/or fractures to reduce loss of treatment fluids into the subterranean formation.

2. The method of claim 1, wherein the precipitated calcium carbonate lost circulation material is formed at a surface location.

3. The method of claim 1, wherein greater than about 95% of the PCCLCM have a unit mesh size of about 1 micrometer to about 100 micrometer.

4. The method of claim 1, wherein the calcium soluble salt is selected from the group consisting of calcium nitrate, calcium acetate, calcium citrate, calcium gluconate, calcium lactate, calcium bromide, calcium chloride, calcium iodide, calcium nitride, calcium formate, and any combination thereof.

5. The method of claim 1, wherein the lost circulation treatment fluid is introduced during an operation selected from the group consisting of a drilling operation, a completion operation, a hydraulic fracturing operation, a cementing operation, and any combination thereof.

6. The method of claim 1, wherein the aqueous base fluid comprises freshwater, saltwater, brine, seawater, produced water, wastewater, or any combination thereof.

7. The method of claim 1, wherein the mixing rate of the reaction mixture is increased to increase one or more particle sizes of the PCCLCM or decreased to decrease one or more particles sizes of the PCCLCM.

8. The method of claim 1, wherein the PCCLCM is needle-shaped aragonite having an aspect ratio of about 1.5-15.

9. The method of claim 1, wherein the non-calcium carbonate fibers are present in an amount from about 6% to about 24%.

10. A method comprising:
forming a precipitated calcium carbonate lost circulation material (PCCLCM) at a surface location from a reaction mixture comprising a calcium species and a supercritical carbon dioxide treatment fluid;
wherein the calcium species is selected from the group consisting of a calcium ion, a calcium soluble salt, and any combination thereof, and
wherein the calcium species and the supercritical carbon dioxide treatment fluid are mixed in a mixing tank fluidically connected to a subterranean formation;
manipulating a condition comprising a concentration of the supercritical carbon dioxide treatment fluid, wherein the manipulation of the condition alters a size and/or a morphology of the PCCLCM; and
adjusting precipitation conditions to alter morphology of the PCCLCM;
adding non-calcium carbonate fibers to the reaction mixture, wherein the non-calcium carbonate fibers are present in an amount from about 1% to about 30% by weight of the PCCLCM; and
introducing a lost circulation treatment fluid into a subterranean formation, the lost circulation treatment fluid comprising an aqueous base fluid and the PCCLCM.

11. The method of claim 10, wherein greater than about 95% of the PCCLCM has a unit mesh size of about 1 micrometer to about 100 micrometer.

12. The method of claim 10, wherein the calcium soluble salt is selected from the group consisting of calcium nitrate, calcium acetate, calcium citrate, calcium gluconate, calcium lactate, calcium bromide, calcium chloride, calcium iodide, calcium nitride, calcium formate, and any combination thereof.

13. The method of claim 10, wherein the lost circulation treatment fluid is introduced during an operation selected from the group consisting of a drilling operation, a completion operation, a hydraulic fracturing operation, a cementing operation, and any combination thereof.

14. The method of claim 10, wherein the aqueous base fluid comprises freshwater, saltwater, brine, seawater, produced water, wastewater, or any combination thereof.

15. The method of claim 10, further comprising a carbonate species, wherein the carbonate species is an ammonium carbonate ion.

16. The method of claim 10, wherein the PCCLCM is needle-shaped aragonite having an aspect ratio of about 1.5-15.

17. A method of treating lost circulation in a subterranean formation comprising:
selecting an aspect ratio for a precipitated calcium carbonate lost circulation material (PCCLCM) based at least in part on a type of the subterranean formation;
forming the PCCLCM to have the selected aspect ratio at a surface location from a reaction mixture comprising a calcium chloride species and an ammonium carbonate ion based on manipulating a reaction rate of the reaction mixture to alter particle size and/or morphology of the PCCLCM, wherein the calcium chloride species and the ammonium carbonate ion are mixed in a mixing tank fluidically connected to a subterranean formation;
adjusting precipitation conditions to alter morphology of the PCCLCM;
adding non-calcium carbonate fibers to the reaction mixture, wherein the non-calcium carbonate fibers are present in an amount from about 1% to about 30% by weight of the PCCLCM; and
introducing a lost circulation treatment fluid into a subterranean formation, the lost circulation treatment fluid comprising an aqueous base fluid and the PCCLCM,
wherein the subterranean formation is a sandstone subterranean formation, a carbonate subterranean formation, or a shale subterranean formation and the PCCLCM further consolidates unconsolidated particulates therein, and wherein the PCCLCM is needle-shaped aragonite having an aspect ratio of about 1.5-15.

18. The method of claim 17, wherein the lost circulation treatment fluid is introduced during an operation selected from the group consisting of a drilling operation, a completion operation, a hydraulic fracturing operation, a cementing operation, and any combination thereof.

19. The method of claim 17, wherein the aqueous base fluid comprises freshwater, saltwater, brine, seawater, produced water, wastewater, and any combination thereof.

20. The method of claim 17, wherein greater than about 95% of the PCCLCM have a unit mesh size of about 1 micrometer to about 100 micrometer.

* * * * *